(12) United States Patent  
Ramamoorthy et al.

(10) Patent No.: US 9,282,176 B2  
(45) Date of Patent: Mar. 8, 2016

(54) VOICE RECOGNITION DIALING FOR ALPHABETIC PHONE NUMBERS

(75) Inventors: Venkatesan Ramamoorthy, Round Rock, TX (US); Keith R. Walker, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2284 days.

(21) Appl. No.: 12/126,802

(22) Filed: May 23, 2008

(65) Prior Publication Data

US 2008/0219414 A1 Sep. 11, 2008

Related U.S. Application Data

(63) Continuation of application No. 11/422,699, filed on Jun. 7, 2006, now abandoned.

(51) Int. Cl.
*H04M 1/64* (2006.01)
*H04M 1/27* (2006.01)
*H04M 3/42* (2006.01)
*G10L 15/26* (2006.01)
*H04W 68/00* (2009.01)

(52) U.S. Cl.
CPC .............. *H04M 1/271* (2013.01); *G10L 15/26* (2013.01); *H04M 3/42204* (2013.01); *H04M 2201/40* (2013.01)

(58) Field of Classification Search
CPC . H04M 15/08; H04M 1/271; H04M 2201/40; H04M 2215/62; H04M 3/42204
USPC .................. 379/88.01, 88.14, 88.03; 455/563
See application file for complete search history.

(56) References Cited

U.S. PATENT DOCUMENTS 5,640,485 A 6/1997 Ranta
5,864,603 A 1/1999 Haavisto et al.
(Continued)

OTHER PUBLICATIONS

S. Bezuayehu, Non-Final Office Action: mail date Aug. 31, 2009; published by the USPTO in utility U.S. Appl. No. 11/422,699, pp. 9.
(Continued)

*Primary Examiner* — Solomon Bezuayehu
(74) *Attorney, Agent, or Firm* — Patents on Demand P.A.; Brian K. Buchheit; Scott M. Garrett

(57) ABSTRACT

Systems, methods and media for determining a phone number from a spoken alphabetic phone number are disclosed. Embodiments may include a method for determining a phone number that includes receiving spoken alphanumeric content from a user, the spoken alphanumeric content having one or more alphabetic characters, such as letters, numbers or words. The spoken alphanumeric content may include termination words or separation words in addition to alphabetic characters. The method may also include parsing the received spoken alphanumeric content to determine equivalent numbers for alphabetic characters in the alphanumeric content, such as by parsing spoken received spoken letters, numbers and/or words to determine their equivalent numbers. The method may also include determining the phone number based on the received spoken alphanumeric content and the determined equivalent numbers. Further embodiments may include dialing the determined phone number after determining the phone number.

19 Claims, 5 Drawing Sheets

(56) References Cited

U.S. PATENT DOCUMENTS

| | | | | |
|---|---|---|---|---|
| 5,912,949 | A * | 6/1999 | Chan | H04M 1/271 379/88.01 |
| 6,018,568 | A * | 1/2000 | Furman et al. | 379/93.15 |
| 6,370,399 | B1 | 4/2002 | Phillips | |
| 6,393,304 | B1 * | 5/2002 | Meche | 455/563 |
| 6,393,404 | B2 | 5/2002 | Meche | |
| 6,449,496 | B1 * | 9/2002 | Beith et al. | 455/563 |
| 6,526,292 | B1 * | 2/2003 | Henry, Jr. | H04M 1/271 379/88.03 |
| 6,947,770 | B2 | 9/2005 | Rydbeck | |
| 7,251,313 | B1 | 7/2007 | Miller et al. | |
| 2002/0198027 | A1 | 12/2002 | Rydbeck | |
| 2003/0007608 | A1 * | 1/2003 | Buntschuh | H04M 1/271 379/88.01 |
| 2004/0029595 | A1 | 2/2004 | Keseg | |
| 2005/0129188 | A1 | 6/2005 | Lee et al. | |
| 2007/0286398 | A1 | 12/2007 | Ramamoorthy | |
| 2007/0286399 | A1 | 12/2007 | Ramamoorthy | |
| 2008/0037745 | A1 | 2/2008 | Ramamoorthy | |
| 2008/0226041 | A1 | 9/2008 | Ramamoorthy | |

OTHER PUBLICATIONS

S. Bezuayehu, Non-Final Office Action; mail date Sep. 25, 2009; published by the USPTO in utility U.S. Appl. No. 11/422,707, pp. 10.

* cited by examiner

VOICE RECOGNITION DIALING FOR ALPHABETIC PHONE NUMBERS

CROSS-REFERENCES TO RELATED APPLICATIONS

Pursuant to 35 USC §120, this continuation application claims priority to and benefit of U.S. patent application Ser. No. 11/422,699, entitled "VOICE RECOGNITION DIALING FOR ALPHABETIC PHONE NUMBERS", filed on Jun. 7, 2006, the disclosure of which is incorporated herein in its entirety for all purposes.

FIELD OF INVENTION

The present invention is in the field of communication devices such as telephones and, in particular, to communication devices that support voice dialing functions.

BACKGROUND

Telephone numbers typically represent one of the primary ways an individual can communicate with another person or an organization such as a business or governmental agency. As telephone numbers have continued to pervade every aspect of modern life, entities (particularly businesses) often attempt to acquire a phone number that is easy to remember. One common way to make a phone number more memorable is to have the number correspond to letters, or alphabetic characters, that correspond to words or acronyms. Example phone numbers would include 800-GO-FEDEX, 800-IBM-HELP, 800-PICK-UPS, and many others. Each letter in a phone number corresponds to a number on a standard keypad for a phone. The letters 'A', 'C', for example, correspond to the number '2' on a standard keypad, 'D', 'E', and 'F' correspond to the number '3', and so on. Particularly for an organization that desires to have its phone number remembered by a large number of existing or potential customers, alphabetical-based phone numbers are considered more memorable, and thus potentially more valuable, than pure numerical phone numbers.

While alphabetic phone numbers are easier to remember for many people, they often prove more difficult to dial than traditional numbers (i.e., phone numbers that consist entirely of numbers). A user attempting to dial an alphabetic-based phone number must translate, or map, each letter in the phone number to an appropriate number. Traditionally, phone keypads have letters listed on the appropriate numbers of the keypad. A user of one of these phones would need to look at the keypad to find each letter and then press the number associated with the letter, a process which may significantly add to the time and complexity of dialing the phone number and thus reduces user satisfaction. Moreover, a user attempting to translate letters into numbers is likely to become more distracted, a problem which can be exacerbated if the user is also performing another task simultaneously, such as driving. Many modern phones that have small keypads to reduce the overall size of the phone (particularly with many cell phones or other mobile phones) remove the letter/number translation entirely or provide, printing that is so small that it is not easily readable.

One solution to this problem is for organizations or others to refrain from using alphabetic phone numbers, but such a solution negates the established advantages of alphabetic numbers. Another solution would be for users that have phones with voice recognition dialing to program an alias for the alphabetic phone number they would like to call. For this solution, the user may train the cell phone, for example, that the spoken words 'IBM Help' should cause the phone to dial 1-800-IBM-Help. Such a solution, however, fails to provide flexibility for a user and forces users to program each alias they wish to set up for alphabetic (or other) numbers. This solution accordingly is inefficient as the user is forced to manually create the aliases and cannot quickly respond to new alphabetic phone numbers that they wish to dial. In addition, most phones with voice recognition dialing also have a limit on the number of aliases available, forcing the user to use valuable alias capability for alphabetic phone numbers. There is, therefore, a need for an effective and efficient solution for dialing alphabetic phone numbers.

SUMMARY OF THE INVENTION

The problems identified above are in large part addressed by systems, methods and media for determining a phone number from an alphabetic phone number. Embodiments may include a method for determining a phone number that includes receiving spoken alphanumeric content from a user, the spoken alphanumeric content having one or more alphabetic characters, such as letters, numbers or words. The spoken alphanumeric content may include one or more of termination words or separation words in addition to alphabetic characters. The method may also include parsing the received spoken alphanumeric content to determine equivalent numbers for alphabetic characters in the alphanumeric content, such as by parsing spoken received spoken letters, numbers, or words to determine their equivalent numbers. The method may also include determining the phone number based on the received spoken alphanumeric content and the determined equivalent numbers. Further embodiments may include dialing the determined phone number after determining the phone number.

Another embodiment provides a machine-accessible medium containing instructions effective, when executing in a data processing system, to cause the system to perform a series of operations for determining a phone number from a spoken alphabetic phone number. The series of operations generally includes receiving spoken alphanumeric content from a user, the spoken alphanumeric content having one or more alphabetic characters, such as letters, numbers, or words. The series of operations may also include parsing the received spoken alphanumeric content to determine equivalent numbers for alphabetic characters in the alphanumeric content, such as by parsing spoken received spoken letters, numbers, or words to determine their equivalent numbers. The series of operations may also include determining the phone number based on the received spoken alphanumeric content and the determined equivalent numbers. Further embodiments may include a series of operations for dialing the determined phone number after determining the phone number.

A further embodiment provides a communication device to place phone calls over a communication network, where the communication device includes a voice recognition dialing system to determine a phone number. The voice recognition dialing system may include a controller interface to communicate with other components of the communications device and an alphabetic parser to receive spoken alphanumeric content having one or more alphabetic characters and to parse the received alphanumeric content to determine equivalent numbers for the alphabetic characters in the received alphanumeric content. The alphabetic parser may also include a phone number analyzer to determine a phone number based on the received spoken alphanumeric content and the determined equivalent numbers. In some embodiments, the alphabetic parser may determine equivalent numbers for spoken letters, numbers and/or words in the received alphabetic characters.

BRIEF DESCRIPTION OF THE DRAWINGS

Aspects of the invention will become apparent upon reading the following detailed description and upon reference to the accompanying drawings in which, like references may indicate similar elements.

DETAILED DESCRIPTION OF EMBODIMENTS

Figure 1:
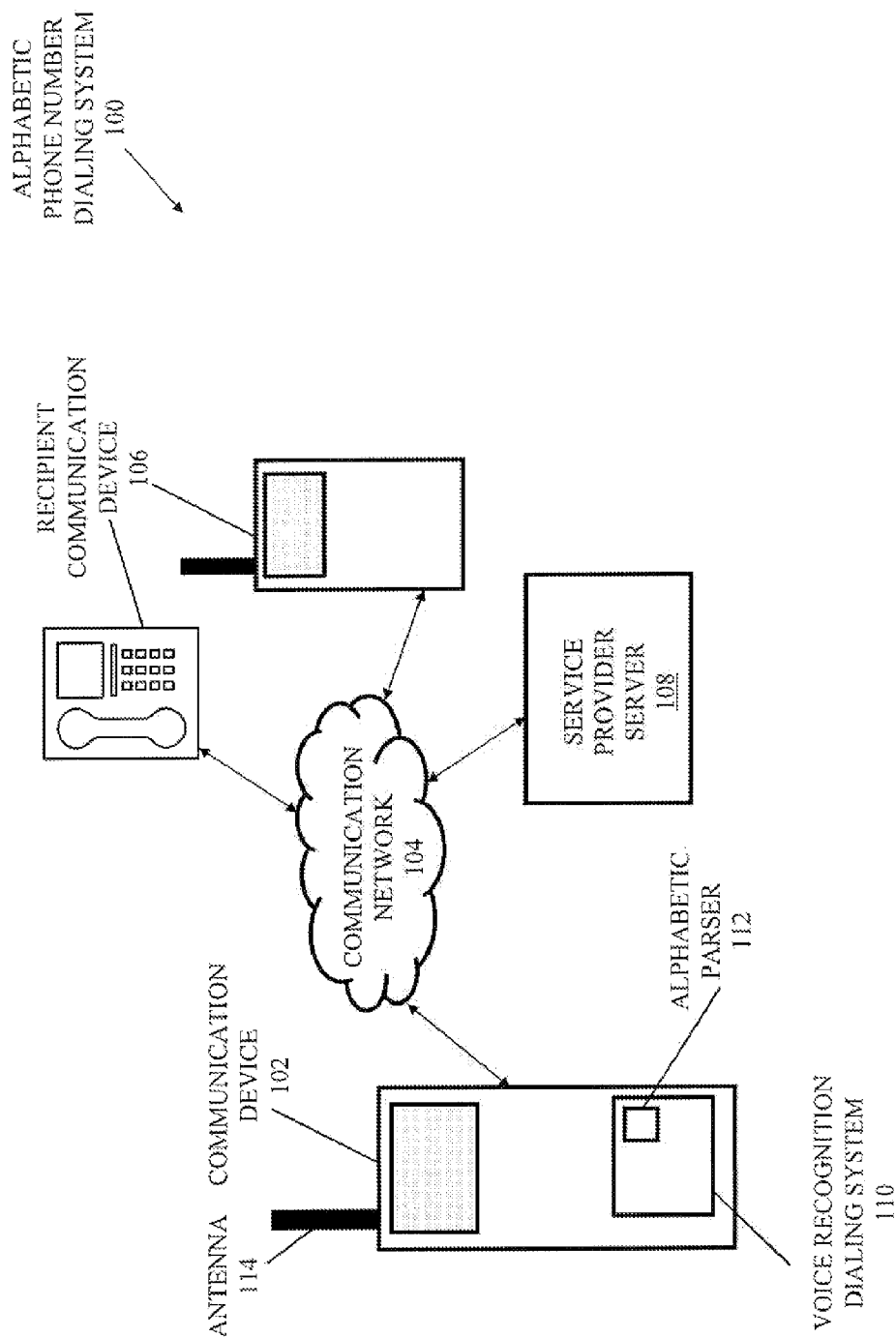
FIG. 1 depicts an environment for an alphabetic phone number dialing system having a communication device with a voice recognition dialing system according to one embodiment.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for determining a phone number from a spoken alphabetic phone number are disclosed. Embodiments may include a method for determining a phone number that includes receiving spoken alphanumeric content from a user, the spoken alphanumeric content having one or more alphabetic characters, such as letters, numbers or words. The spoken alphanumeric content may include termination words or separation words in addition to alphabetic characters. The method may also include parsing the received spoken alphanumeric content to determine equivalent numbers for alphabetic characters in the alphanumeric content, such as by parsing spoken received spoken letters, numbers, or words to determine their equivalent numbers. The method may also include determining the phone number based on the received spoken alphanumeric content and the determined equivalent numbers. Further embodiments may include dialing the determined phone number after determining the phone numbers.

The system and methodology of the disclosed embodiments may provide for voice recognition dialing for spoken alphabetic phone numbers. Using the disclosed system and methodology, a user may simply speak a phone number that includes alphabetic characters such as letters, numbers, or words and their phone (or other communication device) will understand the phone number and optionally dial the phone number. Users may therefore avoid having to waste time translating alphabetic phone numbers so that they may dial each number and may instead simply speak the numbers. The disclosed system and methodology may be particularly useful for users with mobile phones as they may avoid the distraction of translating alphabetic phone numbers while performing other activities, such as driving. For users with phones with very small number/letter translation text or without such text, previous alphabetic phone numbers posed additional problems as translation of alphabetic phone numbers proved more difficult, but users of the disclosed system may instead verbally articulate the phone number without having to perform their own translations. As will be described in more detail subsequently, the disclosed system and methodology may accordingly provide an efficient and effective mechanism for translating, dialing, or otherwise managing alphabetic phone numbers.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware and/or software systems. The invention can take the form of an entirely hardware embodiment, an entirely software embodiment or an embodiment containing both hardware and software elements. In a preferred embodiment, the invention is implemented in software, which includes but it not limited to firmware, resident software, microcode, etc.

Aspects of the invention described herein may be stored or distributed on a computer-readable data storage medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable data storage medium providing program code for use by or in connection with a computer or any instruction execution system. For the purposes of this description, a computer-usable or computer readable data storage medium can be any apparatus that can store the program for use by or in connection with the instruction execution system, apparatus, or device. The medium may be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices though intervening private or public networks, including wireless networks. Modems, cable modems and Ethernet cards are just a few of the currently available types of network adapters.

Turning now to the drawings, FIG. 1 depicts an environment for an alphabetic phone number dialing system having a communication device with a voice recognition dialing system according to one embodiment. The disclosed alphabetic phone number dialing system 100 includes a communication device 102 in communication with one or more recipient communication devices 106 via a communication network 104, as well as an optional service provider server 108 also in communication with the communication network 104. As will be described in more detail subsequently, a user of the communication device 102 may verbally speak an alphabetic phone number to the communication device 102, after which the communication device 102 will translate or convert the spoken alphabetic phone number to a traditional phone number that the communication device 102 may use to dial and connect with a recipient communication device 106. The spoken phone number may include alphanumeric content, which includes alphabetic characters (spoken numbers, letters, and words) as well as termination or separation words. Alphabetic phone numbers are phone numbers with one or more alphabetic characters, which include letters, numbers, and words (including acronyms or abbreviations). Example alphabetic phone numbers include 1-800-IBM-HELP, 1-800-GO-FEDEX, 1-800-PICK-UPS, etc.

Communication device 102 may include any device adapted to communicate via a phone connection (i.e., voice connection) with a recipient communication device 106. Example communication devices 102 include mobile phones (such as cell phones, satellite phones, or car phones) or traditional telephones (that connect to a telephone jack). As depicted in FIG. 1, communication device 102 is a mobile phone with an antenna 114 for transmission and receipt of information with the communication network 104. Communication device 102 may also include a personal computer with an Internet or other network connection that is adapted to allow voice communications, such as using a Voice over Internet Protocol (VoIP) or other Internet telephony connection. In other embodiments, communication device 102 may be a voice communication-enabled personal digital assistant (PDA), automobile-based wireless device, wearable computer system, or other wireless communication device.

To facilitate management of alphabetic phone numbers, the communication device 102 may include a voice recognition dialing system 110 with an alphabetic parser 112, as will be described in more detail in relation to FIG. 3. The voice recognition dialing system 110 may receive spoken phone numbers or other words from a user and may perform various operations in response. The voice recognition dialing system 110 may, for example, upon receiving a spoken alias, dial a phone number associated with the alias. The alphabetic parser 112 of the voice recognition dialing system 110 may receive spoken phone numbers that have alphabetic characters (letters, numbers, or words), parse the characters to determine equivalent numbers for each, and determine a phone number based on the spoken phone number. The voice recognition dialing system 110 may then, in some embodiments, dial the determined phone number, providing a means for a user to speak an alphabetic phone number and have the system translate the spoken words into a traditional phone number.

The communication network 104 may include any data communication channel (or combinations of channels) that allow voice communication between a communication device 102 and a recipient communication device 106. Example communication networks 104 include the Internet, an intranet, a local area network (LAN), a wide area network (WAN), an Ethernet network, wireless network, or telephone network (such as a cellular network). In one example where communication network 104 includes a cellular network, the communication device 102 may be in wireless communication with a base station as part of the communication network 104, which in turn may be in communication with a mobile switching center, gateway mobile switching center (GMSC), or other elements of a cellular network (and all part of the communication network 104). In some embodiments, a communication network 104 may include both a wireless network and a telephone network in communication via a GMSC. Those skilled in the art will recognize, however, that other types of data communication channels included in the communication network 104 without departure from the scope and spirit of the invention.

Recipient communication device 106 may include any device adapted to communicate via a phone connection (i.e., voice connection) with a communication device 102, such as a mobile phone (e.g., cell phones, satellite phones, or car phones) or traditional telephone. Recipient communication devices 106 may include any device suitable for use as a communication device 102, as described previously and in relation to FIG. 2, and the description will not be repeated in the interest of brevity.

Figure 4:
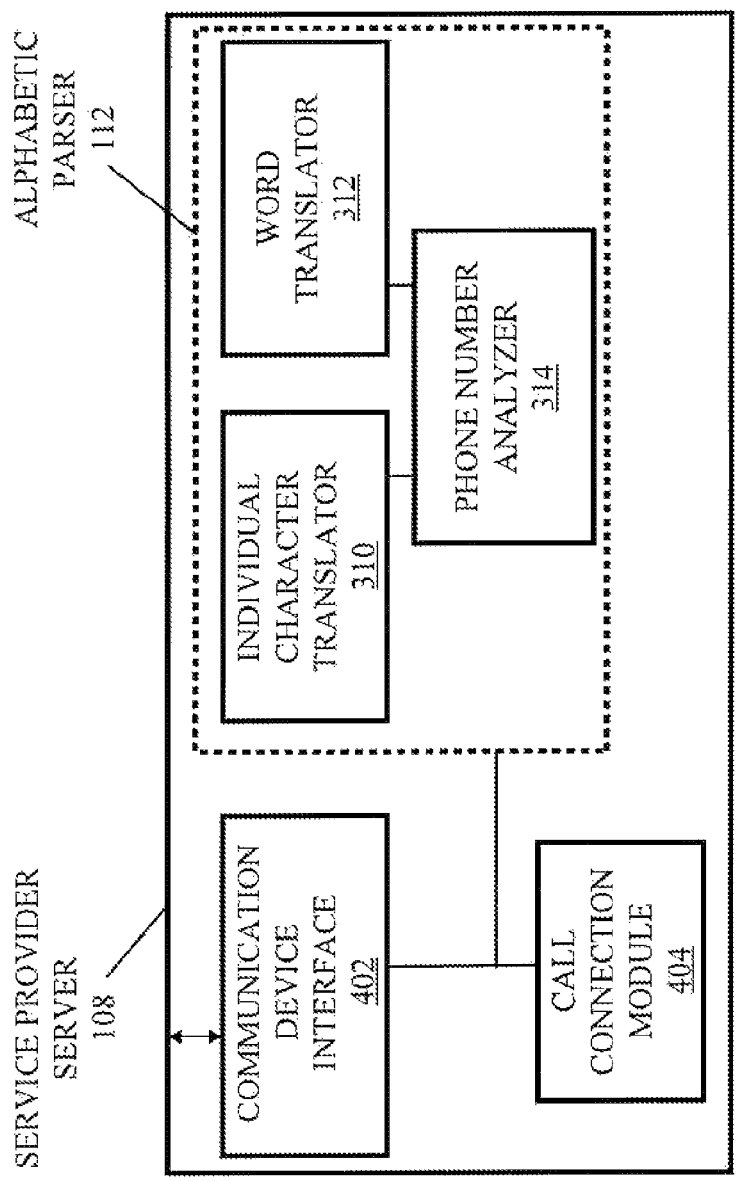
FIG. 4 depicts a conceptual illustration of software components of a service provider server, including an alphabetic parser, according to one embodiment.

Optional service provider server 108, as, described in more detail in relation to FIG. 4, may provide some or all of the functionality of the voice recognition dialing system 110 and its alphabetic parser 112 to a communication device 102. A user with a communication device 102 without a voice recognition dialing system 110, for example, may utilize the service provider server 108 to parse their spoken alphabetic phone number, convert the number to a traditional phone number, and dial the phone number. A service provider server 108 with this capability may serve many communication devices 102 that do not have the required hardware and/or software to manage alphabetic phone numbers themselves. The service provider server 108, if utilized, may thus provide an efficient means to providing alphabetic phone number translation to a plurality of communication devices 102. The service provider server 108 may be one or more of any type of computer system, including servers, personal computers, workstations, mainframe computers, desktop computers, or the like. In one embodiment, the service provider server 108 is an International Business Machines (IBM) IBM® eServer or similar server having one or more processors, or threads of processors, executing software and/or one or more state machines coupled with data storage devices such as random access memory (RAM), read only memory (ROM), flash memory, compact disk drives, hard drives, and the like.

The systems and methodologies of the disclosed embodiments accordingly may provide an efficient and effective mechanism to manage alphabetic phone numbers. A user may speak an alphabetic phone number into their communication device 102 and the communication device 102 (or, alternatively, the service provider server 108) may parse the spoken alphabetic phone number and determine a phone number from the spoken number by determining equivalent numbers for any letters, numbers, or words in the alphabetic phone number. The user may thus avoid having to manually translate the alphabetic phone number, potentially saving time and eliminating dangerous distractions.

Figure 2:
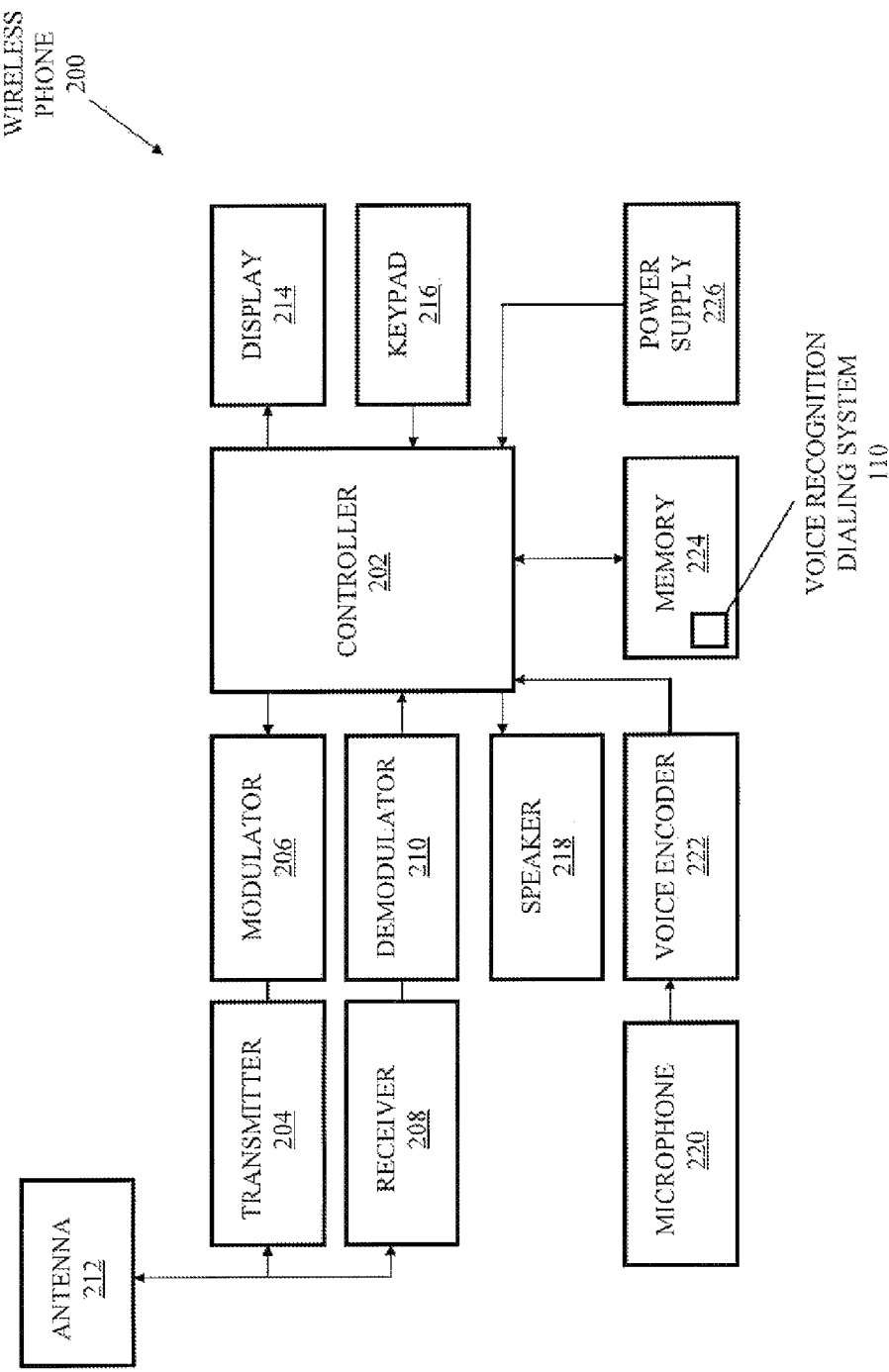
FIG. 2 depicts a block diagram of one embodiment of a wireless phone for use as a communication device.

FIG. 2 depicts a block diagram of one embodiment of a wireless phone for use as a communication device 102. The wireless phone 200 of FIG. 2 is an exemplary embodiment, and one of ordinary skill in the art will recognize other designs may also be suitable, including those designs having capabilities other than those ascribed herein and possibly beyond those capabilities. In the depicted embodiment, the wireless phone 200 includes a controller 202, a transmitter 204, a modulator 206, a receiver 208, and demodulator 210, an antenna 212, a display 214, a keypad 206, a speaker 218, a microphone 220, a voice encoder 222, memory 224, and a power supply 226. The controller 202 may facilitate communication between components of the wireless phone 200, as well as providing communication to the transmitter 204 and from the receiver 208. The controller 202 may include one or more processors to execute instructions, such as an IBM® PowerPC™ processor, an Intel Pentium® processor, an Advanced Micro Devices Inc. processor, a Motorola, Inc. processor, or any other suitable processor. Controller 202 may access and/or store information in memory 224, which may be one or more volatile and/or non-volatile memory modules, such as such as RAM or double data rate (DDR) synchronous dynamic random access memory (SDRAM) modules. In some embodiments, the controller 202 may execute instructions to perform functions of the voice recognition dialing system 110 while all or part is stored in memory 224. The wireless phone 200 may also have a power supply 226, such as a battery or vehicle power, to provide electrical power to components of the wireless phone 200.

The controller 202 may provide signals to the transmitter 204 through a modulator 206 for transmission by antenna 212. Modulator 206 may modulate signals from the controller 202 for transmission by varying a signal to carry information. Similarly, signals received by the receiver 208 through antenna 212 may be provided to the controller 202 through a demodulator 210. Demodulator 210 may demodulate received signals and provide the demodulated signals to the controller 202. In some embodiments, the signals may be in accordance with an air interface standard associated with the communication network 104. Antenna 212 may be an external or internal antenna adapted to facilitate communication between the wireless phone 200 and the communication network 104. In some embodiments, antenna 212 may facilitate communication between the wireless phone 200 and a base site or base station of a communication network 104. A base station may forward messages to and from the wireless phone 200, including voice messages to and from a telephone network.

A user interface for receiving information from a user and providing information to a user includes the display 214, keypad, 216, speaker 218, microphone 220, and voice encoder 222. Display 214 may provide visual information to a user via, for example, a liquid crystal display (LCD) screen. A user may input information via a keypad 216 or other input device, such as a joystick, buttons, levers, or other input devices. A user may speak into a microphone 220 or other transducer device of the wireless phone 200 to speak commands, alphabetic phone numbers, or engage in conversation. The microphone 220 may output to a voice encoder 222 (also known as a vocoder) that, in turn, encodes voice signals and provides the encoded signal to the controller 202 for translation or other processing.

Figure 3:
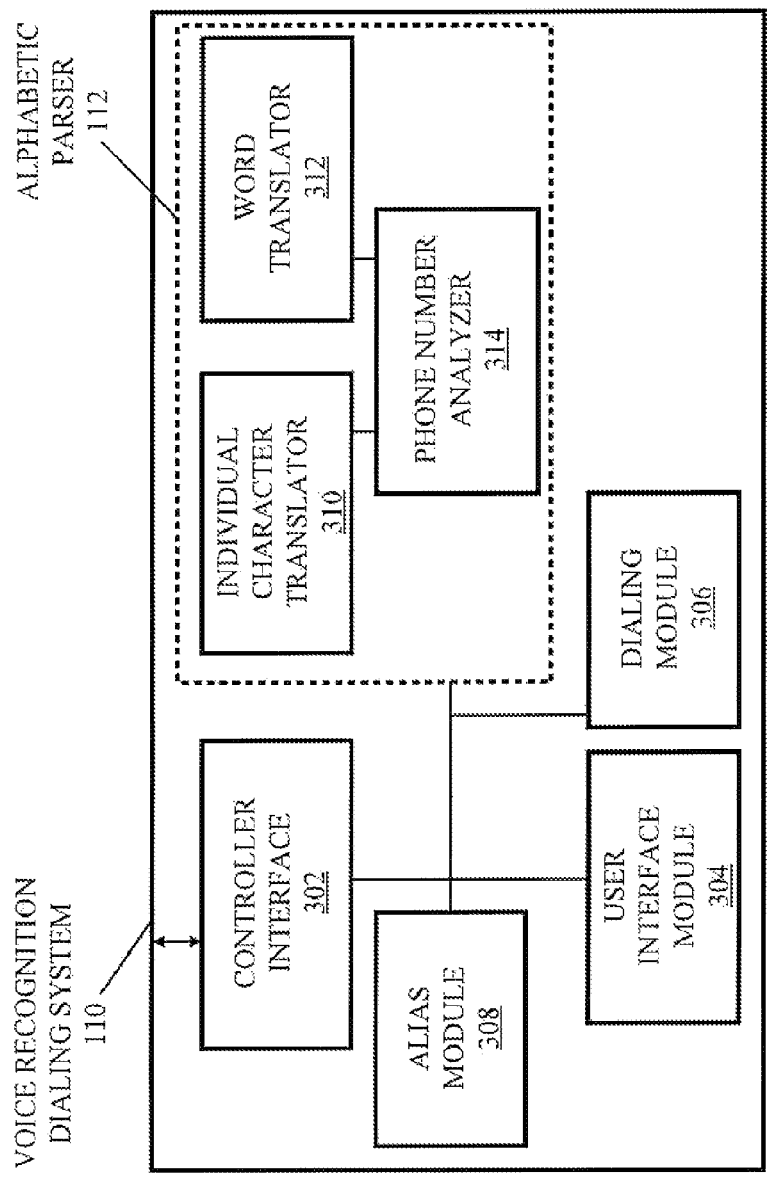
FIG. 3 depicts a conceptual illustration of software components of a voice recognition dialing system, including an alphabetic parser.

FIG. 3 depicts a conceptual illustration of software components of a voice recognition dialing system 110, including an alphabetic parser 112, according to one embodiment. One or more of the software components of the voice recognition dialing system 110 may execute on a processor of a communication device 102, such as in a controller 202 of the wireless phone 200 of FIG. 2. As described previously (and in more detail in relation to FIG. 5), the voice recognition dialing system 110 may receive alphabetic phone numbers from a user, translate or convert the alphabetic phone numbers to traditional phone numbers, and may optionally dial the resultant phone number for the user. The voice recognition dialing system 110 may include a controller interface 302, a user interface module 304, a dialing module 306, and an alias module 308 in addition to the alphabetic parser 112.

The controller interface 302 may facilitate communication and/or interaction between the voice recognition dialing system 110 and other components of the communication device 102. In some embodiments, for example, the controller interface 302 may facilitate communication with the controller 202 or other components of the wireless phone 200. The user interface module 304 may process inputs from a user, including commands or requests, and may also provide output to the user (via controller interface 302). Output from the user interface module 304 may include requests for the user to repeat some or all of phone number, requests for approval to dial the number, providing an audible or visual indication of the spoken phone number, or any other information.

Optional dialing module 306 and alias module 308 may provide additional functionality to the voice recognition dialing system 110. Dialing module 306 may dial a phone number determined by the alphabetic parser 112. In some embodiments, dialing module 306 may dial the determined phone number automatically while in other embodiments, the dialing module 306 may dial the determined phone number upon request by the user. The dialing module 306 may interact with the user interface module 304 in some embodiments to determine a user's preference as to dialing of determined phone numbers. The alias module 308 may receive and interpret an alias spoken by a user and may then, in conjunction with a dialing module 306, dial the phone number associated with the spoken alias. If the voice recognition dialing system 110 is equipped with an alias module 308, users may record and save one or more aliases on their communication device and associate a phone number (which they type in using keypad 216) with each alias. When the user desires to call a phone number associated with an alias, they optionally first speak an activation word that informs the alias module 308 that an alias will soon be spoken and then speak the alias for interpretation and processing by the alias module 308.

The alphabetic parser 112 of the voice recognition dialing system 110 may include an individual character translator 310, a word translator 312, and a phone number analyzer 314. The alphabetic parser 112 and its components may receive spoken alphanumeric content (i.e., a spoken phone number) that has one or more alphabetic characters and may parse the received content to determine equivalent numbers for the alphabetic characters in the received alphanumeric content. As described previously, alphabetic characters may include individual letters, numbers and/or words (which may themselves include traditional words, acronyms, abbreviations, or any multi-letter combinations). The individual character translator 310 may parse individual letters or numbers and determine equivalent numbers for each. The individual character translator 310 may receive a spoken 'A', parse the received letter, and determine that the equivalent number is '2'. Similarly, the word translator 310 may parse any words of the alphabetic characters to determine equivalent numbers for each letter in the recognized word. As an example, the word translator 310 may parse the acronym 'IBM' and determine the equivalent numbers as '426' by translating each letter included within the word.

The individual character translator 310 and word translator 312 may work in conjunction for words with both letters/numbers and words. In one example, if a user articulates '1-800' as 'one eight hundred' as part of a spoken phone number, the word translator 312 may translate the spoken words 'eight hundred' as the number '800' while the individual character translator 310 may translate the spoken number one as a '1' to form a determined number of '1800'. One of ordinary skill in the art will recognize that any combination of spoken letters, numbers, and/or words may be parsed and equivalent numbers determined. Recognition of spoken letters and words is known in the art and one of ordinary skill in the art will also recognize that the individual character translator 310 and word translator 312 may utilize algorithms presently known or later developed to parse letters, numbers, and words based on accents, different voices, dictionaries, etc.

The alphabetic parser 112 may also receive and interpret termination words and/or separation words. Termination words may be any words that a user may speak to signal that they have completed speaking the phone number, such as 'end'. Separation words may include any words that a user may speak as part of a phone number that do not impact the determined number, such as if a user says 'dash' or 'hyphen' in between the '1' and '800' of '1-800'.

The phone number analyzer 314 of the alphabetic parser 112 may also determine the phone number that was spoken based on the received spoken alphanumeric content and the determined equivalent numbers. The phone number analyzer 314 may accomplish this by combining the determined equivalent numbers of the individual character translator 310 and/or word translator 312. The phone number analyzer 314 may also determine if the determined phone number is valid, such as based on its length or presence of an area code, and may request the user to repeat all or part of the phone number if it is not valid.

FIG. 4 depicts a conceptual illustration of software components of a service provider server 108, including an alphabetic parser 112, according to one embodiment. As described previously, the service provider server 108 may receive spoken alphabetic phone numbers from a user via their communication device 102 and communication network 104. The service provider server 108 may determine phone numbers based on spoken alphabetic phone numbers for a user of a communication device 102. The service provider server 108 may be particularly useful for users with communication devices that do not have voice recognition capability or alphabetic parsers 112. For example, a cell phone provider may maintain a service provider server 108 to allow all of its users, including ones with legacy devices without voice recognition capability, to use alphabetic phone numbers.

The service provider server 108 may include a communication device interface 402 and a call connection module 404 in addition to an alphabetic parser 112. Alphabetic parser 112 was described in relation to FIG. 3 and the description will not be repeated in the interest of brevity. The alphabetic parser 112 of FIG. 4 may receive communications from a plurality of communication devices 102 and may also, in some embodiments, process alphabetic phone numbers from multiple communication devices 102 simultaneously.

The communication device interface 402 may facilitate communications to and from one or more communication devices 102 via communication network 104, such as by receiving spoken communications from a user of a communication device 102 for processing. The optional call connection module 404 may call or otherwise connect the requesting user's communication device 102 with the phone number determined by the alphabetic parser 112. The call connection module 404 may thus provide an efficient solution for dialing alphabetic phone numbers once the spoken numbers is parsed and the traditional phone number is determined.

Figure 5:
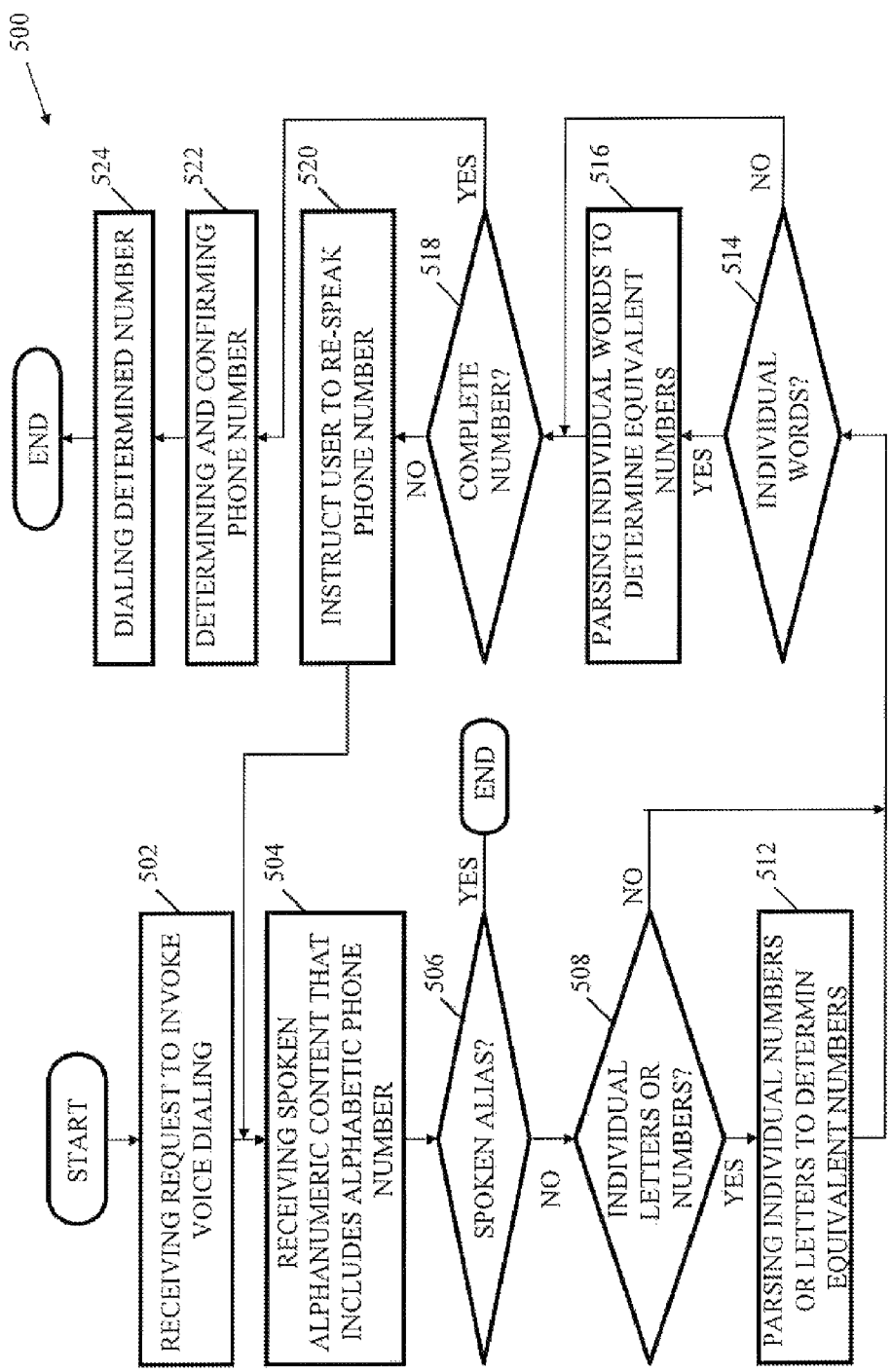
FIG. 5 depicts an example of a flow chart for receiving spoken alphanumeric content, determining equivalent numbers for alphabetic characters, and determining a phone number according to one embodiment.

FIG. 5 depicts an example of a flow chart 500 for receiving spoken alphanumeric content, determining equivalent numbers for alphabetic characters, and determining a phone number according to one embodiment. The method of flow chart 500 may be performed, in one embodiment, by a voice recognition dialing system 110 and its components, such as an alphabetic parser 112. Flow chart 500 begins with element 502, where the alphabetic parser 112 may receive a request to invoke voice dialing and, in particular, alphabetic phone number-enabled voice dialing. In some embodiments, the request to the alphabetic parser 112 may result from a command word spoken by the user, a noise (e.g., a whistle), a button or other input device actuation by the user, etc. In other embodiments, element 502 is unnecessary and alphabetic parser 112 is automatically ready to receive and process spoken alphanumeric content.

The alphabetic parser 112 may receive spoken alphanumeric content at element 504, such as alphanumeric content spoken by a user into a communication device 102, received by a controller interface 302 of a voice recognition dialing system 110, and passed to the alphabetic parser 112. As described previously, the alphanumeric content may be a spoken phone number and may include alphabetic characters such as letters and words forming an alphabetic phone number. The alphanumeric content may also optionally include a termination word or sound that indicates that the user has completed speaking the phone number or a separation word that can be ignored. In one example, a user may speak the telephone number '1-800-IBM-HELP' as a combination of spoken words, letters, and numbers such as 'one eight hundred I B M help' or 'one eight zero zero I B M H E L P'. As will be described in more detail subsequently, the disclosed methodology may parse the spoken number, determine equivalent numbers, and determine the phone number the user spoke in traditional form.

In the event that the communication device 102 has an alias system as part of the voice recognition dialing system 110 (and thus has an alias module 308), the alias module 308 may determine at optional decision block 506 whether the user spoke a recognized alias. If the user did speak a recognized alias, the method of flow chart 500 terminates and the alias module 308 may then process the alias by dialing its associated phone number. If the user did not speak a recognized alias (or alias functionality is not present), the method of flow chart 500 continues to decision block 508.

The individual character translator 310 of the alphabetic parser 112 may determine at decision block 508 whether the alphabetic characters of the alphanumeric content include any individual letters or numbers. If the received alphanumeric content has no letters or numbers (i.e., it is composed entirely of words), the method of flow chart 500 continues to decision block 514 for parsing of the words. If the alphabetic characters in the alphanumeric content include individual characters, the individual character translator 310 may parse the individual numbers and/or letters to determine equivalent numbers for each of the spoken characters (letters and/or numbers). In the examples above, individual character translator 310 may parse the spoken numbers such as '1', '8', or 'zero' and the spoken letters such as 'I', 'B', 'M', 'H', 'E', 'L', or 'P'. The number '1', spoken as 'one', may have the determined equivalent number of '1' while the letter 'B' may have the determined equivalent number of '2'.

The word translator 312 of the alphabetic parser 112 may determine at decision block 514 whether the alphabetic characters of the alphanumeric content include any words (including combinations of words). If the received alphanumeric content has no words (i.e., it is composed entirely of letters or numbers), the method of flow chart 500 continues to decision block 518 for further processing. If the alphabetic characters in the alphanumeric content include words, the word translator 310 may parse the words to determine equivalent numbers for each of the spoken words. In the examples above, the word translator may parse spoken words such as 'help' or 'eight hundred' into equivalent numbers. The word 'help' may have a determined equivalent number of '4357' (based on standard conversions). The phrase 'eight hundred' may have the determined equivalent number of '800' as the spoken, longer number is translated to a standard number.

Accordingly, the individual letter translator 310 and the word translator 312 may, alone or in combination, adapt to different ways a user may speak an alphabetic phone number. If a user spells out '8-0-0', for example, the individual letter translator 310 may parse each spoken number, while if the user speaks 'eight hundred' the word translator 312 may parse the spoken words to determine the equivalent numbers. The individual letter translator 310 and word translator 312 may work in conjunction to parse the alphabetic characters and, in some embodiments, their functionality may be combined into one module.

After determining equivalent numbers, the phone number analyzer 314 of the alphabetic parser 112 may determine whether the determined equivalent numbers form a complete phone number at decision block 518. If there are insufficient determined equivalent numbers to form a full phone number, the alphabetic parser 112 may instruct the user to re-speak all or part of the phone number at element 520 (via voice request, display, etc.) and flow chart 500 may return to element 504 for processing of the re-spoken number. If the alphabetic parser 112 determines that there are sufficient equivalent numbers for a complete phone number, the method of flow chart 500 may continue to element 522, where the phone number analyzer 314 may determine the phone number. Determining the phone number may include combining the different determined equivalent numbers, adding, an area code, adding a '1' in front of the number, a number to reach an outside line, etc. The phone number analyzer 314 may optionally display or audibly play back the determined phone number to the user for confirmation at element 522. Additionally, the dialing module 306 of the voice recognition dialing system 110 or other module may optionally dial the determined phone number for the user, after which the method terminates.

It will be apparent to those skilled in the art having the benefit of this disclosure that the present invention contemplates methods, systems, and media for determining a phone number from spoken alphanumeric content. It is understood that the form of the invention shown and described in the detailed description and the drawings are to be taken merely as examples. It is intended that the following claims be interpreted broadly to embrace all the variations of the example embodiments disclosed.

What is claimed is:

1. A method for determining a phone number, the method comprising:
 a communication device receiving a request to invoke voice dialing;
 the communication device receiving a spoken utterance; and
 in response to the spoken utterance matching an alias of one or more aliases saved in the communication device, each of the one or more aliases being associated with a corresponding phone number, a communication device dialing the phone number that corresponds to the matched alias; or
 in response to the spoken utterance not matching any of the one or more aliases:
  the communication device parsing alphanumeric content in the spoken utterance to determine equivalent numbers for alphabetic characters in the alphanumeric content;
  the communication device determining a phone number based on the alphanumeric content and the determined equivalent numbers; and
  the communication device dialing the determined phone number to connect with the determined phone number.

2. The method of claim 1, wherein:
 the alphanumeric content comprises at least one individual word and at least two alphabetic characters;
 said parsing of the received alphanumeric content comprises:
  parsing the alphanumeric content for the at least two characters and converting each of the at least two characters into a corresponding digit of the determined phone number; and
  after parsing and converting the at least two characters, parsing the alphanumeric content for the at least one individual word, converting the at least one individual word into text, and converting each of the alphabetic characters of the text into a corresponding digit of the determined phone number; and
 said determining the phone number comprises combining the corresponding digits in order in accordance with the spoken utterance.

3. The method of claim 1, further comprising instructing the user to re-speak the spoken utterance in response to determining that the determined phone number is incomplete.

4. The method of claim 1, wherein the alphanumeric content further comprises one or more separation words, wherein each of the separation words is a word spoken as part of a phone number that does not impact the determined number, and wherein the one or more separation words comprises one of a dash and a hyphen.

5. The method of claim 1, wherein the alphanumeric content further comprises at least one termination word indicating that a user has completed speaking a phone number.

6. The method of claim 1, further comprising:
 repeating said method for a plurality of different iterations, wherein in at least one of the different iterations, the spoken utterance matches the alias, and wherein in at least one of the different iterations, the spoken utterance does not match any of the one or more aliases.

7. A computer program product for determining a phone number, the computer program product comprising:
 one or more computer-readable tangible storage devices;

program instructions, stored on at least one of the one or more storage devices, to receive a request to invoke voice dialing;

program instructions, stored on at least one of the one or more storage devices, to receive a spoken utterance;

program instructions, stored on at least one of the one or more storage devices, to determine whether the spoken utterance matches one or more aliases saved in a communication device, each of the one or more aliases being associated with a corresponding phone number;

program instructions, stored on at least one of the one or more storage devices, responsive to the spoken utterance matching an alias of the one or more aliases, to dial the phone number that corresponds to the matched alias; and program instructions, stored on at least one of the one or more storage devices, responsive to the spoken utterance not matching any of the one or more aliases, to:

parse alphanumeric content in the spoken utterance to determine equivalent numbers for alphabetic characters in the alphanumeric content;

determine the phone number based on the alphanumeric content and the determined equivalent numbers; and dial the determined phone number to connect a communication device with the determined phone number.

8. The computer program product of claim 7, wherein:

the alphanumeric content comprises at least one individual word and at least two alphabetic characters;

said program instructions to parse the alphanumeric content:

parse the alphanumeric content for the at least spoken characters and convert each of the at least two characters into a corresponding digit of the determined phone number;

after parsing and converting the at least two characters, parse the alphanumeric content for the at least one individual word, convert the at least one individual word into text, and convert each of the alphabetic characters of the text into a corresponding digit of the determined phone number; and said program instructions to determine the phone number combine the corresponding digits in order by the spoken utterance.

9. The computer program product of claim 7, further comprising:

program instructions, stored on at least one of the one or more storage devices, to instruct the user to re-speak the spoken utterance in response to determining that the determined phone number is incomplete.

10. The computer program product of claim 7, wherein the program instructions to parse the alphanumeric content determine that the alphabetic characters include letters, numbers, and words, and that the alphanumeric content comprises one or more termination words and one or more separation words in addition to one or more alphabetic characters.

11. The computer program product of claim 7, wherein the program instructions to parse the alphanumeric content determine that the alphanumeric content comprises one or more separation words, wherein each of the one or more separation words is a word spoken as part of a phone number that does not impact the determined number, and wherein the one or more separation words comprise one of a dash and a hyphen.

12. The computer program product of claim 7, wherein the program instructions to parse the alphanumeric content determine that the alphanumeric content comprises at least one termination word, wherein the at least one termination word indicates that a user has completed speaking a phone number.

13. The computer program product of claim 7, wherein the program instructions to parse the received alphanumeric content determine that the alphanumeric content includes one or more letters, one or more numbers, and one or more words.

14. The method of claim 1, wherein said communication device parsing said alphanumeric content is a server computer, and wherein said communication device determining said phone number is a server computer.

15. The method of claim 1, wherein the alphanumeric content includes one or more spoken letters, one or more spoken numbers, and one or more spoken words.

16. A computer system for placing phone calls over a communication network, the computer system comprising:

one or more processors, one or more computer-readable memories, and one or more computer readable tangible storage devices;

program instructions, stored on at least one of the one or more storage devices for execution by at least one of the one or more processors via at least one of the one or more memories, to receive a request to invoke voice dialing;

program instructions, stored on at least one of the one or more storage devices for execution by at least one of the one or more processors via at least one of the one or more memories, to receive a spoken utterance;

program instructions, stored on at least one of the one or more storage devices for execution by at least one of the one or more processors via at least one of the one or more memories, to determine whether the spoken utterance matches one or more aliases saved in a communication device, each of the one or more aliases being associated with a corresponding phone number;

program instructions, stored on at least one of the one or more storage devices for execution by at least one of the one or more processors via at least one of the one or more memories, responsive to the spoken utterance matching an alias of the one or more aliases, to dial the phone number that corresponds to the matched alias; and program instructions, stored on at least one of the one or more storage devices for execution by at least one of the one or more processors via at least one of the one or more memories, responsive to the spoken utterance not matching any of the one or more aliases, to:

parse alphanumeric content in the spoken utterance to determine equivalent numbers for alphabetic characters in the alphanumeric content;

determine the phone number based on the alphanumeric content and the determined equivalent numbers; and dial the determined phone number to connect a communication device with the determined phone number.

17. The computer system of claim 16, wherein:

the alphanumeric content comprises at least one individual word and at least two alphabetic characters;

said program instructions to parse the alphanumeric content:

parse the alphanumeric content for the at least spoken characters and convert each of the at least two characters into a corresponding digit of the determined phone number;

after parsing and converting the at least two characters, parse the alphanumeric content for the at least one individual word, convert the at least one individual word into text, and convert each of the alphabetic characters of the text into a corresponding digit of the determined phone number; and said program instructions to determine the phone number combine the corresponding digits in order by the spoken utterance.

18. The computer system of claim 16, further comprising:
program instructions, stored on at least one of the one or more storage devices for execution by at least one of the one or more processors via at least one of the one or more memories, to instruct the user to re-speak the spoken utterance in response to determining that the determined phone number is incomplete.

19. The computer system of claim 16, wherein the program instructions to parse the alphanumeric content determine that the alphabetic characters include letters, numbers, and words, and that the alphanumeric content comprises one or more termination words and one or more separation words in addition to one or more alphabetic characters.

\* \* \* \* \*